United States Patent
Matsunaga

(10) Patent No.: US 9,544,187 B2
(45) Date of Patent: Jan. 10, 2017

(54) COMMUNICATION SYSTEM, MANAGEMENT DEVICE, NETWORK NODE, AND COMMUNICATION METHOD

(71) Applicant: NEC Corporation, Tokyo (JP)

(72) Inventor: Yasuhiko Matsunaga, Tokyo (JP)

(73) Assignee: NEC CORPORATION, Tokyo (JP)

(*) Notice: Subject to any disclaimer, the term of this patent is extended or adjusted under 35 U.S.C. 154(b) by 1 day.

(21) Appl. No.: 14/424,567

(22) PCT Filed: Aug. 29, 2013

(86) PCT No.: PCT/JP2013/005103
§ 371 (c)(1),
(2) Date: Feb. 27, 2015

(87) PCT Pub. No.: WO2014/034115
PCT Pub. Date: Mar. 6, 2014

(65) Prior Publication Data
US 2015/0222482 A1    Aug. 6, 2015

(30) Foreign Application Priority Data

Aug. 29, 2012 (JP) ................................ 2012-188519

(51) Int. Cl.
*H04L 12/24* (2006.01)
*H04W 24/02* (2009.01)
(Continued)

(52) U.S. Cl.
CPC .......... *H04L 41/0806* (2013.01); *H04L 41/12* (2013.01); *H04M 3/00* (2013.01); *H04W 24/02* (2013.01);
(Continued)

(58) Field of Classification Search
CPC ....... H04L 41/0806; H04L 41/12; H04M 3/00; H04W 24/02; H04W 24/10; H04W 76/021; H04W 84/18; H04W 88/08; H04W 92/04
(Continued)

(56) References Cited

U.S. PATENT DOCUMENTS 8,873,753 B2 * 10/2014 Parker .................... H04L 63/20
                                                    380/250
2008/0020801 A1    1/2008 Fesas et al.
(Continued)

FOREIGN PATENT DOCUMENTS

JP    11-136290    5/1999
JP    11-243417    9/1999
(Continued)

OTHER PUBLICATIONS

Extended European Search Report—EP 13 83 2971—Feb. 26, 2016.
(Continued)

*Primary Examiner* — Chi H Pham
*Assistant Examiner* — Robert Lopata
(74) *Attorney, Agent, or Firm* — Young & Thompson

(57) ABSTRACT

It is an object of the present invention to provide a communication system that makes it possible to designate, from among a plurality of first network nodes managed by a management device, a first network node that will acquire operation information on a second network node managed by another management device. A communication system according to the present exemplary embodiment includes a plurality of first network nodes, a management device managing the plurality of first network nodes, and a second network node managed by another management device different from the management device, wherein the man-
(Continued)

agement device selects, from among the plurality of first network nodes, a designated network node that will acquire operation information on the second network node, and the designated network node acquires operation information from the second network node and transmits the operation information to the management device.

18 Claims, 15 Drawing Sheets

(51) Int. Cl.
  *H04M 3/00* (2006.01)
  *H04W 24/10* (2009.01)
  *H04W 76/02* (2009.01)
  *H04W 92/04* (2009.01)
  *H04W 84/18* (2009.01)
  *H04W 88/08* (2009.01)

(52) U.S. Cl.
  CPC .......... *H04W 24/10* (2013.01); *H04W 76/021* (2013.01); *H04W 84/18* (2013.01); *H04W 88/08* (2013.01); *H04W 92/04* (2013.01)

(58) Field of Classification Search
  USPC .......................................................... 370/254
  See application file for complete search history.

(56) References Cited

U.S. PATENT DOCUMENTS

| | | | | |
|---|---|---|---|---|
| 2009/0176487 A1* | 7/2009 | DeMarco | ............. | H04B 7/2606 455/422.1 |
| 2011/0053598 A1* | 3/2011 | Ahluwalia | ............ | H04W 36/22 455/436 |
| 2011/0066677 A1* | 3/2011 | Saito | ....................... | H04L 12/24 709/203 |
| 2011/0131255 A1* | 6/2011 | Kawamura | ........... | H04W 24/08 707/812 |
| 2013/0138793 A1 | 5/2013 | Nishioka | | |
| 2015/0257147 A1* | 9/2015 | Ji | ........................... | H04W 16/14 370/329 |

FOREIGN PATENT DOCUMENTS

| | | |
|---|---|---|
| WO | 2008/011149 | 1/2008 |
| WO | 2012020782 | 2/2012 |

OTHER PUBLICATIONS

Vodafone: "SON philosophy for LTE", 3GPP Draft; S5-071275, 3rd Generation Partnership Project (3GPP), Mobile Competence Centre; 650, Route Des Lucioles; F-06921 Sophia-Antipolis Cedex; France, vol. SA WG5, No. Orlando, FL.; 20070622, Jun. 22, 2007 (Jun. 22, 2007), XP050305927, [retrieved on Jun. 22, 2007] *the whole document*.

3rd Generation Partnership Project; Technical Specification Group Services and System Aspects; Telecommunication Management; Self-Organizing Networks (SON); Concepts and requirements (Release 11), 3GPP Standard; 3GPP TS 32.500, 3rd Generation Partnership Project (3GPP), Mobile Competence Centre; 650, Route Des Lucioles; F-06921 Sophia-Antipolis Cedex; France, vol. SA WG5, No. V11.1.0, Dec. 22, 2011 (Dec. 22, 2011), pp. 1-13, XP050555096, [retrieved on Dec. 22, 2011] * p. 6-p. 7* *p. 10*.

3GPP TS 36.331 V11.1.0 (Sep. 2012) 3rd Generation Partnership Project; Technical Specification Group Radio Access Network; Evolved Universal Terrestrial Radio Access (E-UTRA); Radio Resource Control (RRC); Protocol specification (Release 11).

3GPP TS 36.423 V11.0.0 (Mar. 2012) 3rd Generation Partnership Project; Technical Specification Group Radio Access Network; Evolved Universal Terrestrial Radio Access (E-UTRAN); X2 application protocol (X2AP) (Release 11).

3GPP TR 36.902 V9.3.1 (Mar. 2011) 3rd Generation Partnership Project; Technical Specification Group Radio Access Network; Evolved Universal Terrestrial Radio Access Network (E-UTRAN); Self-configuring and self-optimizing network (SON) use cases and solutions (Release 9).

* cited by examiner

FIG. 8

INTER-BS TOPOLOGY DATABASE (DB)

| | | LIST OF IDS OF BASE STATIONS IN 2nd BASE STATION GROUP A2 | | | |
|---|---|---|---|---|---|
| | | 28 | 29 | 30 | 31 |
| LIST OF IDS OF BASE STATIONS IN 1st BASE STATION GROUP A1 | 21 | ○ | ○ | | |
| | 22 | ○ | ○ | | |
| | 23 | ○ | ○ | ○ | |
| | 24 | | ○ | ○ | ○ |
| | 25 | | | ○ | ○ |
| | 26 | | | ○ | ○ |

FIG. 9

| OPERATION INFORMATION ACQUISITION-TARGET BS DATABASE (DB) | | LIST OF IDS OF BASE STATIONS IN 2nd BASE STATION GROUP B2 | | | |
|---|---|---|---|---|---|
| | | 28 | 29 | 30 | 31 |
| LIST OF IDS OF BASE STATIONS IN 1st BASE STATION GROUP B1 | 21 | ○ | ○ | | |
| | 22 | | | | |
| | 23 | | | | |
| | 24 | | | ○ | |
| | 25 | | | | ○ |
| | 26 | | | | |

FIG. 10

| OPERATION INFORMATION DATABASE (DB) | | | | | | |
|---|---|---|---|---|---|---|
| | | LIST OF IDS OF BASE STATIONS IN 2nd BASE STATION GROUP C2 | | | | |
| | | 28 | 29 | 30 | 31 |
| OPERATION INFORMATION O1 | LOAD | *** Mb/s | *** Mb/s | *** Mb/s | *** Mb/s |
| | NEIGHBOR CELL LIST | {a,b,c,...} | {a,b,c,...} | {a,b,c,...} | {a,b,c,...} |
| | RACH SETTING | *** | *** | *** | *** |
| | ... | ... | ... | ... | ... |

FIG. 15

OPERATION INFORMATION DATABASE (DB)

| | | LIST OF IDS OF BASE STATIONS IN 2nd BASE STATION GROUP C2 | | | |
|---|---|---|---|---|---|
| | | 28 | 29 | 30 | 31 |
| OPERATION INFORMATION O1 | LOAD | *** Mb/s | *** Mb/s | *** Mb/s | *** Mb/s |
| | NEIGHBOR CELL LIST | {a,b,c,...} | {a,b,c,...} | {a,b,c,...} | {a,b,c,...} |
| | RACH SETTING | *** | *** | *** | *** |
| | NUMBER OF ACTIVE USERS | *** users | *** users | *** users | *** users |
| | MAX TRANSMISSION POWER | *** dBm | *** dBm | *** dBm | *** dBm |
| | ⋮ | ⋮ | ⋮ | ⋮ | |

COMMUNICATION SYSTEM, MANAGEMENT DEVICE, NETWORK NODE, AND COMMUNICATION METHOD

TECHNICAL FIELD

The present invention relates to the collection of operation information on network nodes.

BACKGROUND ART

In a cellular-based mobile communication system, a large number of base stations are deployed in a wide area, and each base station covers one to about ten small zones known as cells. Here, standardization groups such as 3GPP (3rd Generation Partnership Program) go ahead with the standardization of a system called Self Organizing Network (SON), which autonomously changes parameters of base stations and the like based on the values of radio quality measured by base stations and terminals in a mobile communication system.

For example, NPL 1 describes a SON-related standardization. In the standardization described in NPL 1, the followings are cited as SON use cases: Coverage and Capacity Optimization, Energy Savings, Interference Reduction, Automated Configuration of Physical Cell Identity, Mobility Robustness Optimization, Mobility Load Balancing, RACH Optimization, Automatic Neighbor Relation Function, and the like.

Moreover, NPL 2 describes that methods for the deployment of functions for implementing SON in a wireless system complying with the LTE (Long Term Evolution) standardization are classified as follows.

(1) NM-Centralized SON: the SON algorithm is executed at network management level.

(2) EM-Centralized SON: the SON algorithm is executed at element management level.

(3) Distributed SON: the SON algorithm is executed at network element level.

Moreover, the deployment of the functions in which the SON algorithm is divided and executed at two or more of (1), (2) and (3) above, is known as Hybrid SON.

In the deployment of the functions according to (1) above, the SON algorithm is executed in a centralized manner by a network management system (NMS), which integrates multiple element management systems (EMSs) and secondarily manages base stations.

In the deployment of the functions according to (2) above, the SON algorithm is executed in a centralized manner by an EMS that primarily manages base stations.

In the deployment of the functions according to (3) above, information required for SON is directly exchanged between network elements (here, assumed to be base stations). The SON algorithm is executed by base stations in a distributed manner.

Incidentally, an EMS is provided for each vender of base stations in general. Accordingly, there are some cases where operation information on base stations cannot be transmitted and received between EMSs. In this case, inter-base station interfaces need to be used in order for an EMS in a system with the deployment of the functions according to (2) above to acquire operation information on a neighbor base station out of its own management.

Similarly, there are some cases where operation information on base stations cannot be transmitted and received between NMSs. In this case, inter-base station (or inter-EMSs) interfaces need to be used in order for an NMS in a system with the deployment of the functions according to (1) above to acquire operation information on a base station out of its own management.

Note that an inter-base station interface in LTE is defined as the X2 interface in NPL 3. Examples of operation information on a base station transmitted and received over the X2 interface include load information on each cell (RESOURCE STATUS UPDATE) and configuration information on a neighbor cell list and random access channels (ENB CONFIGURATION UPDATE).

CITATION LIST

Non-Patent Literature

[NPL 1]
3GPP TR 36.902, "Evolved Universal Terrestrial Radio Access Network (E-UTRAN); Self-configuring and self-optimizing network (SON) use cases and solutions (Release 9)", v.9.3.1 (2011.03)
[NPL 2]
3GPP TS 36.331, "Self-Organizing Networks (SON); Concepts and requirements (Release 11)", v.11.1.0 (2011.12)
[NPL 3]
3GPP TS 36.423, "Evolved Universal Terrestrial Radio Access Network (E-UTRAN); X2 application protocol (X2AP) (Release 11)", v.11.0.0 (2012.03)

SUMMARY OF INVENTION

Technical Problem

As described above, in a system with the deployment of the functions according to (1) or (2) described above, inter-base station interfaces need to be used in order for a management device managing multiple first base stations to collect operation information on a second base station managed by another management device. That is, a first base station needs to collect operation information on the second base station by using an inter-base station interface and to transfer the collected operation information to the management device.

Here, base station groups managed respectively by different management devices are connected usually with redundancy. That is, M first base stations managed by a management device are connected to N second base stations managed by another management device in a mesh topology, in which a maximum of M×N inter-base station interfaces are formed. In this case, each of the N second base stations is connected to the M first base stations at maximum.

However, in the mobile communication systems described in NPLs 1 to 3, a base station that will acquire operation information on a second base station cannot be designated from among the multiple first base stations. Consequently, when a second base station is connected to M first base stations, a situation arises in which each of the M first base stations acquires operation information on the same second base station by using inter-base station interfaces.

Due to this, the amounts of signals transmitted and received over the inter-base station interfaces become too large for the bandwidth available to the inter-base station interfaces, causing the problem that delays occur in control between base stations.

This problem is caused by the fact that in the mobile communication systems described in NPLs 1 to 3, it is impossible to designate, from among multiple first base stations managed by a management device, a base station that will acquire operation information on a second base station managed by another base station.

Additionally, this problem may arise not only among base stations but also among other network devices. For example, it may arise among multiple base station management devices (e.g., EMSs) managed by mutually different network management devices (e.g., NMSs).

In view of the above-Mentioned problem, an object of the present invention is to provide a communication system that makes it possible to designate, from among multiple first network nodes managed by a management device, a first network node that will acquire operation information on a second network node managed by another management device.

Solution to Problem

A communication system according to the present exemplary embodiment comprises: a plurality of first network nodes; a management device managing the plurality of first network nodes; and a second network node managed by another management device different from the management device, wherein the management device selects a designated network node that will acquire operation information on the second network node, from among the plurality of first network nodes, and the designated network node acquires the operation information from the second network node and transmits the operation information to the management device.

A management device according to the present exemplary embodiment is a management device managing a plurality of first network nodes and comprises: a selection section for selecting a designated network node that will acquire operation information on a second network node managed by another management device different from the management device, from among the plurality of first network nodes; and a communication section for receiving the operation information on the second network node from the designated network node.

A network node according to the present exemplary embodiment is a first network node managed by a management device and comprises a communication section that, when the first network node is selected as a designated network node that will acquire operation information on a second network node managed by another management device different from the management device, transmits the operation information on the second network node to the management device.

A communication method according to the present exemplary embodiment comprises the steps of: selecting a designated network node that will acquire operation information on a second network node, from among a plurality of first network nodes; by the designated network node, transmitting the operation information on the second network node to a management device; and by the management device, receiving the operation information on the second network node.

A program according to the present exemplary embodiment causes a computer to execute the steps of: selecting a designated network node that will acquire operation information on a second network node, from among a plurality of first network nodes; by the designated network node, transmitting the operation information on the second network node to a management device; and by the management device, receiving the operation information on the second network node.

A recording medium according to the present exemplary embodiment is a computer-readable information recording medium and records the program according to the present exemplary embodiment.

Advantageous Effects of Invention

According to the present invention, it is possible to designate, from among multiple first network nodes managed by a management device, a first network node that will acquire operation information on a second network node managed by another management device.

BRIEF DESCRIPTION OF DRAWINGS

FIG. 8 is a schematic diagram showing an example of an inter-base station topology database in the communication system according to the second exemplary embodiment of the present invention.

FIG. 9 is a schematic diagram showing an example of an operation information acquisition-target base station database in the communication system according to the second exemplary embodiment of the present invention.

FIG. 10 is a schematic diagram showing an example of an operation information database in the communication system according to the second exemplary embodiment of the present invention.

FIG. 15 is a schematic diagram showing an example of an operation information database in a communication system according to a third exemplary embodiment of the present invention.

DESCRIPTION OF EMBODIMENTS

Exemplary embodiments of the present invention will be described with reference to drawings. However, these embodiments are not intended to limit the technical scope of the present invention.

1. First Exemplary Embodiment

1.1) System Architecture

A communication system according to a first exemplary embodiment of the present invention will be described using FIG. 1.

A communication system 10 according to the present exemplary embodiment includes a plurality of first network nodes $11_{1-M}$, a management device 12 managing the plurality of first network nodes $11_{1-M}$, and a second network node 13 managed by another management device different from the management device 12.

The management device 12 selects a designated network node that will acquire operation information on the second network node 13, from among the plurality of first network nodes $11_{1-M}$. The designated network node then acquires operation information on the second network node 13 from the second network node 13 and transmits this operation information to the management device 12. Note that the management device 12 in the present exemplary embodiment is assumed to select a first network node $11_1$ as a designated network node. In this case, the first network node $11_1$ acquires operation information on the second network node 13 from the second network node 13 and transmits this operation information to the management device 12.

Figure 2:
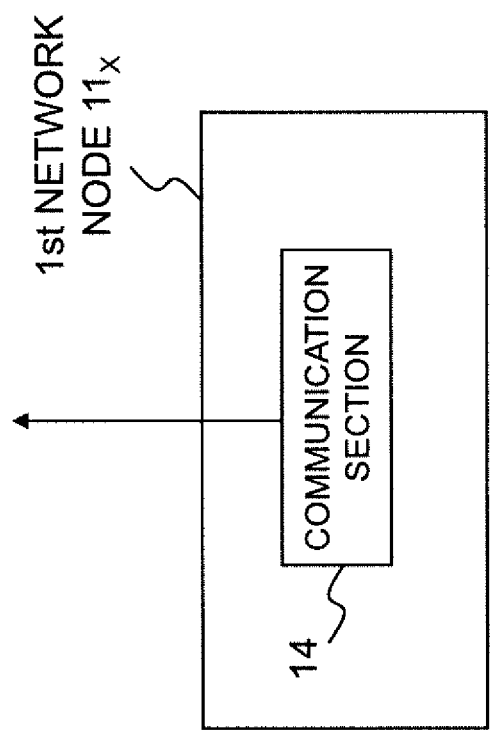
FIG. 2 is a block diagram showing an example of a configuration of a first network node in the communication system according to the first exemplary embodiment of the present invention.

Next, FIG. 2 shows an example of a configuration of a first network node $11_x$ (x=1, 2, . . . or M) included in the plurality of first network nodes $11_{1-M}$. The first network node $11_x$ includes a communication section 14. When the first network node $11_x$ is selected as a designated network node to acquire operation information on the second network node 13, the communication section 14 transmits operation information on the second network node 13 to the management device 12.

Figure 3:
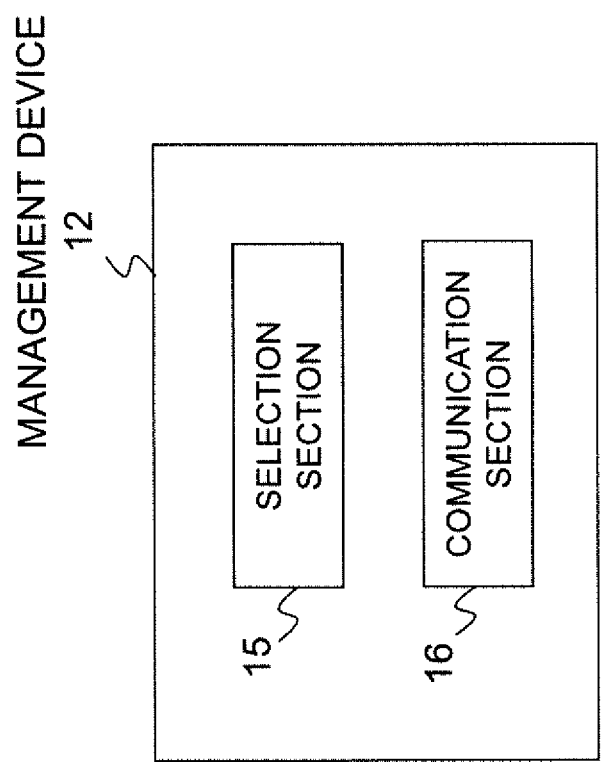
FIG. 3 is a block diagram showing a functional configuration of a management device according to the first exemplary embodiment of the present invention.

Next, FIG. 3 shows an example of a functional configuration of the management device 12. The management device 12 includes a selection section 15 and a communication section 16. The selection section 15 selects a designated network node that will acquire operation information on the second network node 13, from among the plurality of first network nodes $11_{1-M}$. The communication section 16 receives operation information on the second network node 13 from the designated network node.

1.2) System Operation

Figure 4:
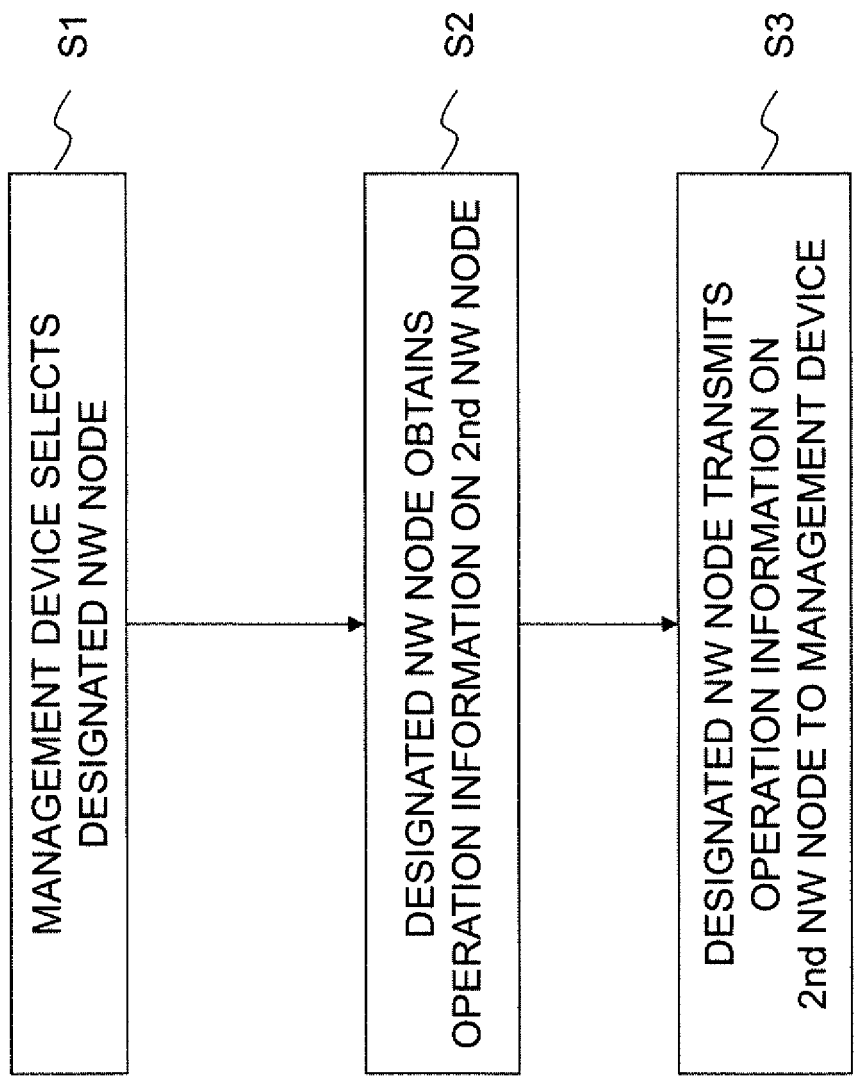
FIG. 4 is a flowchart for describing operations in the communication system according to the first exemplary embodiment of the present invention.

Next, operations in the communication system according to the present exemplary embodiment will be described using FIG. 4. First, the management device 12 selects a designated network node that will acquire operation information on the second network node 13, from among the plurality of first network nodes $11_{1-M}$ (Operation S1). Subsequently, the designated network node acquires operation information on the second network node 13 (Operation S2). Then, the designated network node transmits the operation information on the second network node 13 acquired in Operation S2 to the management device 12 (Operation S3).

1.3) Effects

As described above, the management device 12 according to the present exemplary embodiment selects a designated network node that will acquire operation information on the second network node 13, from among the plurality of first network nodes $11_{1-M}$. Accordingly, even if all the first network nodes $11_{1-M}$ are connected to the second network node 13, the management device 12 can limit the number of first network nodes 11 that will acquire operation information on the second network node 13 to, for example, one.

In the communication system 10 according to the present exemplary embodiment, as described above, it is possible to designate, from among the plurality of first network nodes $11_{1-M}$ managed by the management device 12, a first network node that will acquire operation information on the second network node 13 managed by another management device.

Hence, in the communication system 10 according to the present exemplary embodiment, it is possible to control the amount of operation information on network nodes transmitted/received over inter-network node interfaces. Accordingly, the bandwidth of the inter-network node interfaces can be used efficiently, so that it is possible to prevent delays from occurring in control between network nodes. Further, it is also possible to prevent degradation of services provided to the equipment covered by network nodes.

Additionally, the management device 12 according to the present exemplary embodiment can update network setting information for the communication system 10 by using the collected operation information on second network nodes. Thus, the management device 12 can perform autonomous optimization of the communication network 10.

2. Second Exemplary Embodiment

2.1) System Architecture

Next, a communication system according to a second exemplary embodiment of the present invention will be described using FIG. 5. Interfaces connecting a first management device 27 to a first base station group are, for example, the Itf-B interfaces prescribed by 3GPP.

Base stations 21 to 26 included in the first base station group are connected to each other through inter-base station interfaces (not shown). Similarly, base stations 28 to 31 included in a second base station group are also connected to each other through inter-base station interfaces (not shown). Moreover, the first and second base station groups are also connected to each other through inter-base station interfaces 33. Note that the inter-base station interfaces 33 are, for example, the X2 interfaces prescribed by 3GPP.

Figure 6:
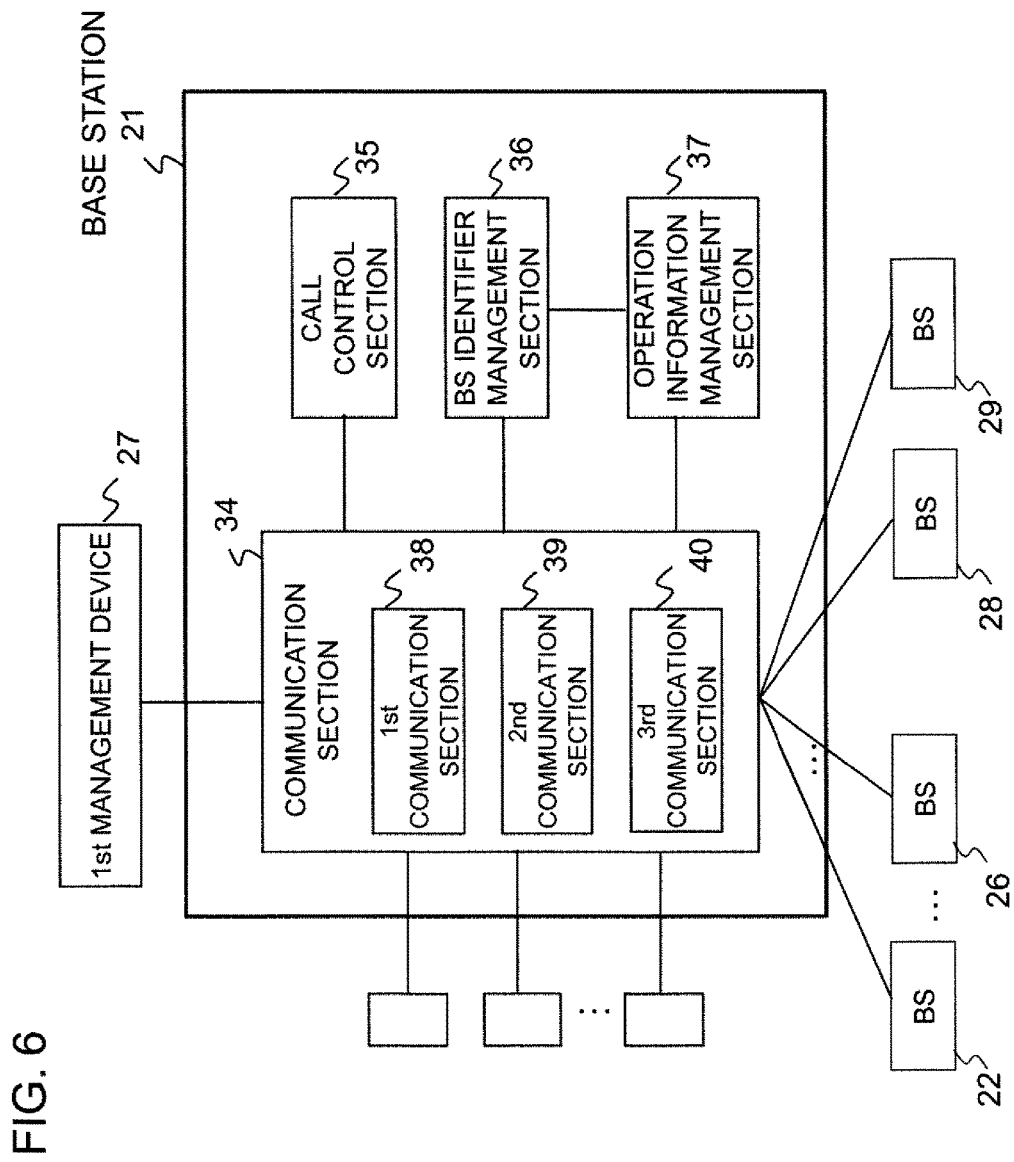
FIG. 6 is a block diagram showing a configuration of a base station in the communication system according to the second exemplary embodiment of the present invention.

Next, FIG. 6 shows a configuration of the base station 21. The base station 21 includes a communication section 34, a call control section 35, a base station identifier management section 36, and an operation information management section 37.

The communication section 34 includes a first communication section 38, a second communication section 39, and a third communication section 40. The first communication section 38 communicates with the first management device 27 over an interface between the base station 21 and the first management device 27. For example, the first communication section 38 transmits to the first management device 27 an identifier of and operation information on a base station connected through an inter-base station interface. The second communication section 39 communicates with a plurality of mobile stations over radio links to transmit and receive user data. Moreover, the third communication section 40 communicates with the base stations 22 to 26, 28 and 29 over inter-base station interfaces. For example, the third communication section 40 transmits and receives control information and operation information over the inter-base station interfaces.

The call control section 35 makes a call to and receives a call from a mobile station as well as performs handover control and radio resource allocation.

The base station identifier management section 36 manages a list of identifiers of connected base stations to which the base station 21 is connected (hereinafter, referred to as a connected base station list). Moreover, the base station identifier management section 36 manages a list of identifiers of other base stations on which the base station 21 should acquire operation information (hereinafter, referred to as an acquisition-target base station list).

The operation information management section 37 collects operation information on other base stations through inter-base station interfaces, based on the acquisition-target base station list managed by the base station identifier management section 36. Moreover, the operation information management section 37 also keeps statistics on internal configuration information on its own station and traffic.

Figure 7:
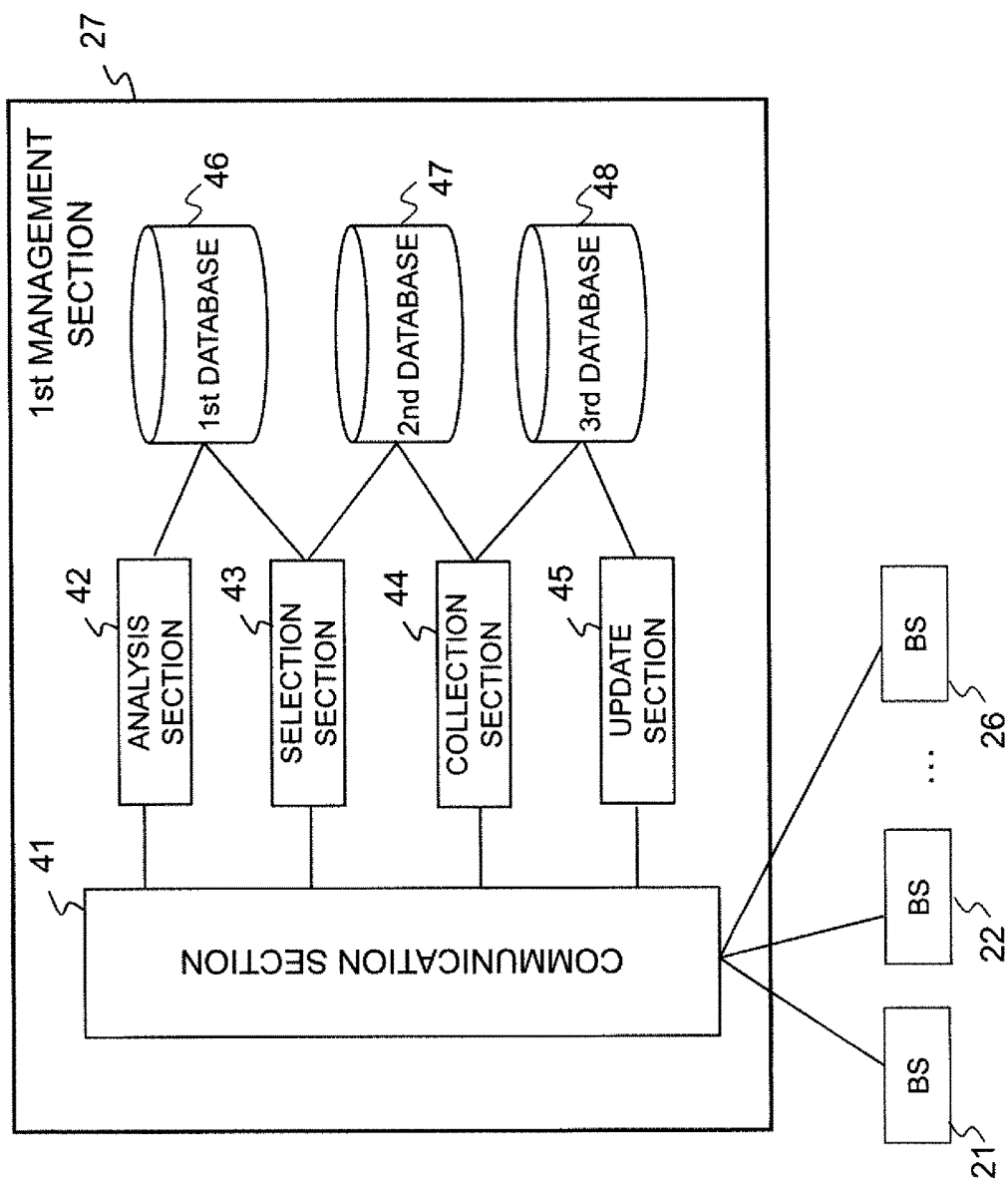
FIG. 7 is a block diagram showing a configuration of a first management device according to the second exemplary embodiment of the present invention.

Next, FIG. 7 shows a configuration of the first management device 27. The first management device 27 includes a communication section 41, an analysis section 42, a selection section 43, a collection section 44, an update section 45, a first database 46, a second database 47, and a third database 48.

The communication section 41 transmits and receives operation information, base station identifiers and the like to/from the base stations 21 to 26 over the interfaces between the first management device 27 and the first base station group.

The analysis section 42 analyzes an inter-base station topology, based on the base station identifiers received from the base stations 21 to 26. Note that the analysis section 42 analyzes not only the topology among the base stations 21 to 26 of the first base station group but also a topology between these stations 21 to 26 and the base stations 27 to 30 of the second base station group. The analysis section 42 then creates an inter-base station topology database including connection information, which shows the topologies among base stations. The first database 46 stores the inter-base station topology database created by the analysis section 42.

The selection section 43 refers to the inter-base station topology database stored by the analysis section 42 and selects a base station that will acquire operation information on each of the base stations 28 to 31 of the second base station group (hereinafter, referred to as a designated base station), from among the base stations 21 to 26 of the first base station group. The selection section 43 then, based on a result of the selection, creates an operation information acquisition-target base station database including association information in which the base stations of the second base station group are associated with the designated base stations to acquire their operation information. The second database 47 stores the operation information acquisition-target base station database created by the selection section 43.

The collection section 44, based on the operation information acquisition-target base station database recorded in the second database 47, collects from the designated base stations operation information on the respective associated base stations of the second base station group. The third database 48 stores an operation information database including the operation information collected by the collection section 44.

The update section 45, based on the operation information on the base stations included in the operation information database recorded in the third database 48, updates network setting information for the communication system 20 to improve network characteristics.

2.2) Database

<Inter-Base Station Topology Database>

Next, a description will be given of the inter-base station topology database recorded in the first database 46 according to the present exemplary embodiment. The inter-base station topology database includes connection information showing a topology among the base stations of the first and second base station groups. FIG. 8 shows an example of the inter-base station topology database. The inter-base station topology database shown in FIG. 8 is a database in which a list of the identifiers of the base stations of the first base station group (A1) and a list of the identifiers of the base stations of the second base station group (A2) are presented in tabular form. Moreover, a predetermined mark ("O" in FIG. 8) is entered when base stations are connected through an inter-base station interface, and another predetermined mark or no mark is entered when they are not connected. Note that it is assumed that it can be uniquely determined whether a base station is included in the first base station group or in the second base stations group, based on the range of the identifiers of the base stations of each group or the like.

Figure 5:
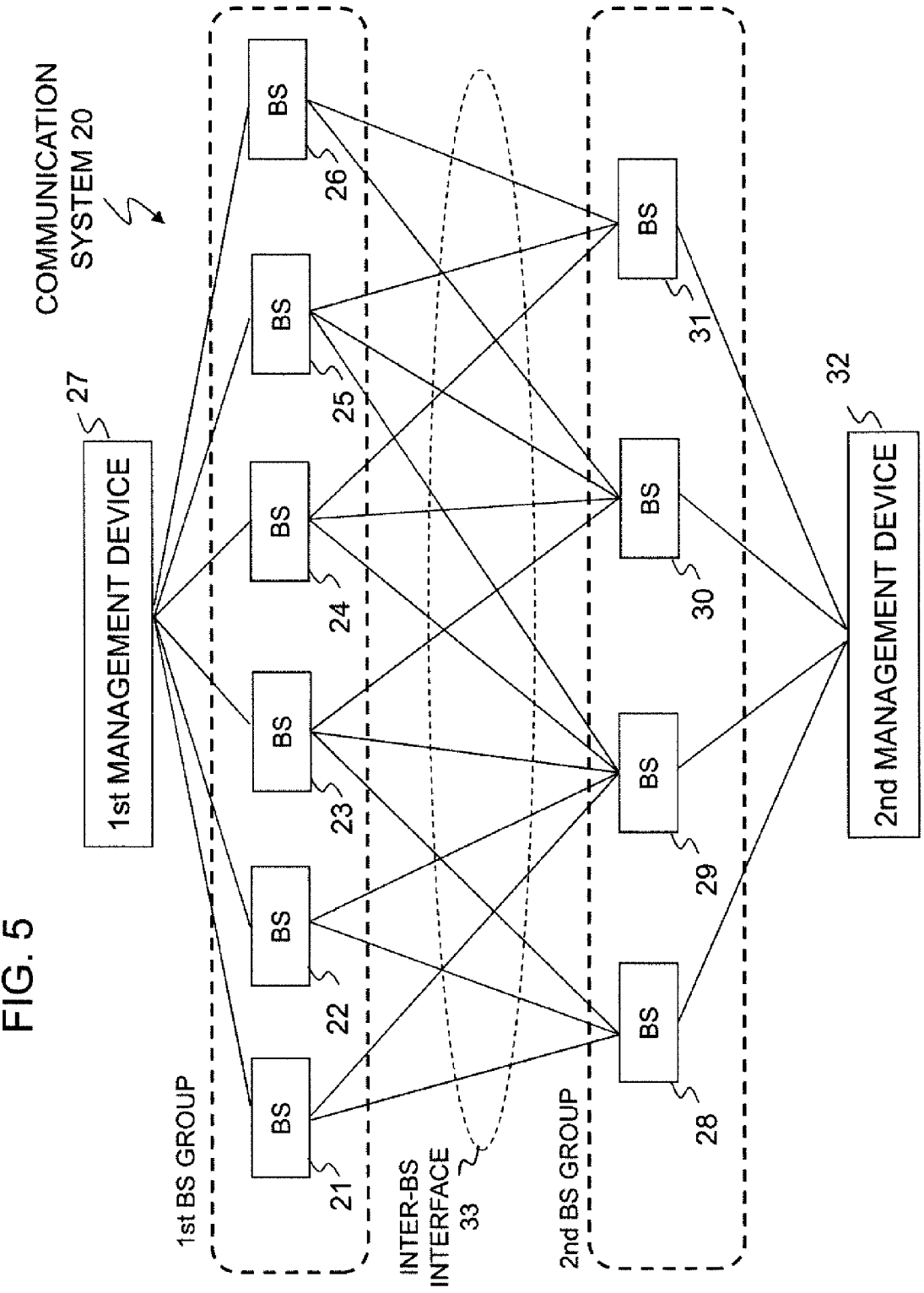
FIG. 5 is a block diagram showing an architecture of a communication system according to a second exemplary embodiment of the present invention.

Here, the inter-base station topology database shown in FIG. 8 reflects a topology in the architecture of the communication system shown in FIG. 5. That is, the inter-base station topology database shown in FIG. 8 indicates a topology in which the base station 21 is connected to the base stations 28 and 29, the base station 22 is connected to the base stations 28 and 29, the base station 23 is connected to the base stations 28 to 30, the base station 24 is connected to the base stations 29 to 31, the base station 25 is connected to the base stations 29 to 31, and the base station 26 is connected to the base stations 30 and 31.

Note that the inter-base station topology database may be configured to include a topology among the base stations of the first base station group, that is, the base stations 21 to 26, which, however, is omitted in the present exemplary embodiment.

<Operation Information Acquisition-Target Base Station Database>

Next, a description will be given of the operation information acquisition-target base station database recorded in the second database 47 according to the present exemplary embodiment. The operation information acquisition-target base station database includes association information in which the base stations of the second base station group are associated with designated base stations that will acquire operation information on these base stations of the second base station group. FIG. 9 shows an example of the operation information acquisition-target base station database. The operation information acquisition-target base station database shown in FIG. 9 is a database in which a list of the identifiers of the base stations of the first base station group (B1) and a list of the identifiers of the base stations of the second base station group (B2) are presented in tabular form. A predetermined mark ("O" in FIG. 9) is entered at the intersection of the identifier of a base station included in the second base station group and the identifier of a designated base station that will collect operation information on this base station. On the other hand, the intersections of other base stations are marked with another predetermined mark or left blank.

Note that in FIG. 9, for each of the base stations 28 to 31 of the second base station group, only one designated base station to collect operation information thereon is selected from among the base stations 21 to 26 of the first base station group. Thus, operation information on a base station included in the second base station group is collected non-redundantly.

That is, based on the operation information acquisition-target base station database shown in FIG. 9, operation information on the base stations of the second base station group is collected as follows. Operation information on the base stations 28 and 29 is collected by the base station 21; operation information on the base station 30 is collected by the base station 23; operation information on the base station 31 is collected by the base station 24.

Note that the selection section 43 may be configured to select designated base stations to acquire operation information on the base stations of the second base station group, based on the loaded state of each of the base stations of the first base station group. For example, a base station in heavily loaded state in the first base station group may be configured so as not to be selected as a designated base station that will collect operation information on a base station of the second base station group. Thus, it is possible to achieve load balancing among the base stations of the first base station group.

Moreover, for each base station of the first base station group, an upper limit may be set on the number of base stations of the second base station group on which operation information is acquired. Thus, it is possible to prevent the role as a designated base station to acquire operation information from being concentrated upon a specific base station, so that load balancing can be achieved.

Further, a base station that has been found to be halt operation temporarily for the reason of energy saving control or the like may be configured so as not to be selected as a designated base station to acquire operation information on a base station of the second base station group. Thus, it is possible to prevent the frequent occurrence of a change of a base station that will collect operation information.

Furthermore, considering network loads, it is also possible to redundantly collect operation information on a base station included in the second base station group. For example, two or more base stations are selected from among the base stations of the first base station group as designated base stations for a base station included in the second base station group so that operation information on a single base station is collected redundantly, whereby reliability can also be increased.

<Operation Information Database>

Next, a description will be given of the operation information database recorded in the third database 48. The operation information database includes operation information on the base stations of the second base station group collected by the first management device 27 from those base stations of the first base station group that are selected as designated base stations. FIG. 10 shows an example of the operation information database. The operation information database shown in FIG. 10 includes the loads on base stations, neighbor cell lists, and random access channel settings as information elements of the operation information on the base stations of the second base station group. Information indicating the load on a base station may be, for example, PRB Usage (Physical Resource Block Usage), gross downlink transmission power, uplink broadband received power, or total throughput. Note that the operation information database may be configured to include not only operation information on the base stations of the second base station group but also operation information on the base stations of the first base station group. Moreover, when a base station covers a plurality of cells, operation information may be collected for each cell, not for each base station. Further, the operation information database may be formed to keep not only the latest operation information but also past operation information on a time-series basis.

2.3) System Operation

Figure 11:
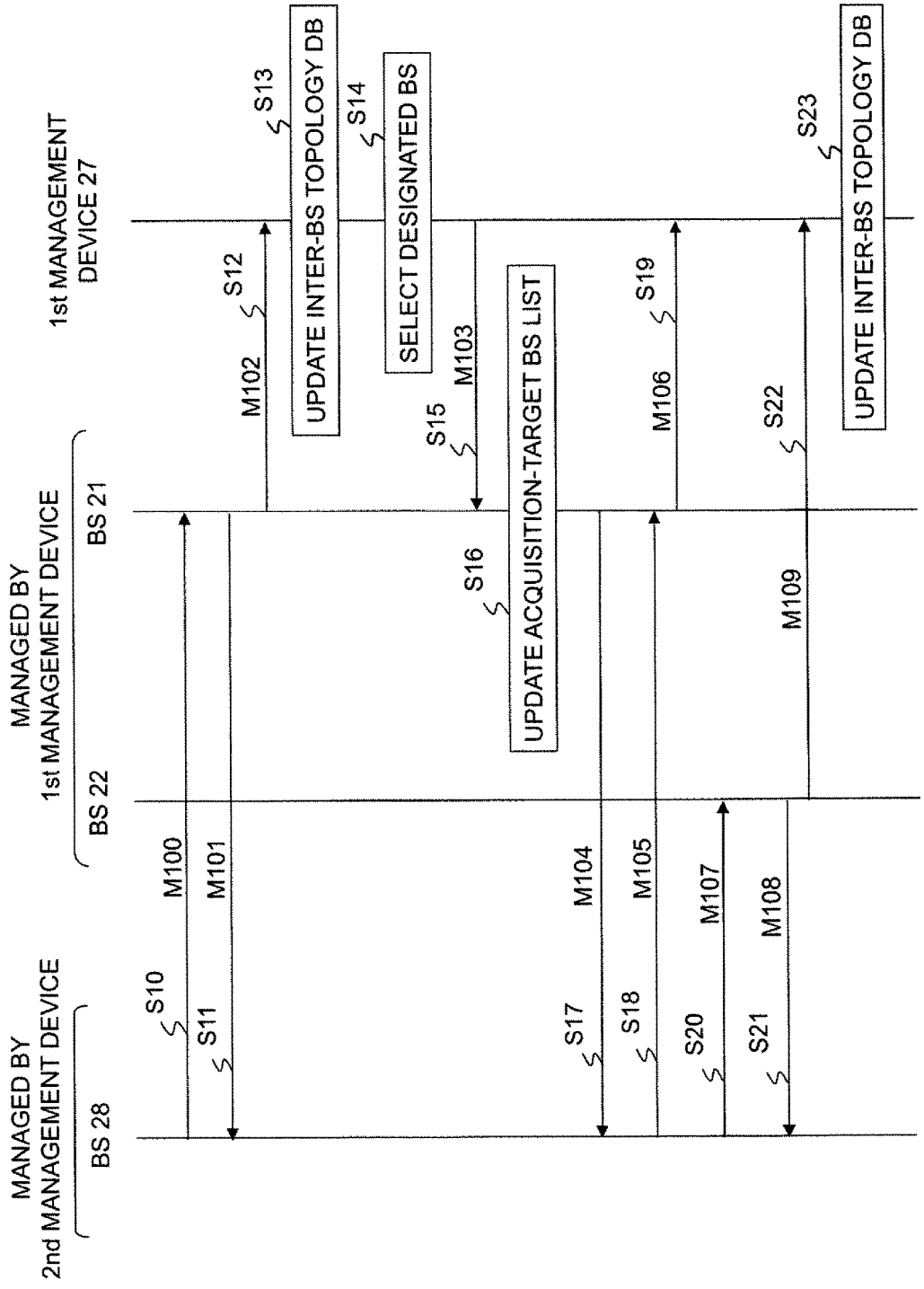
FIG. 11 is a sequence diagram showing operations in a message exchange procedure in the communication system according to the second exemplary embodiment of the present invention.

Next, operations according to the present exemplary embodiment will be described using FIG. 11. FIG. 11 shows a sequence diagram of a message exchange procedure between the first management device 27 and base stations in the present exemplary embodiment. Note that it is assumed that the base station 28 of the second base station group has not been connected to any of the base stations 21 to 26 of the first base station group before the sequence shown in FIG. 11 is started.

First, the base station 28 of the second base station group transmits an inter-base station interface setup request message M100 to the base station 21 of the first base station group (Operation S10). The inter-base station interface setup request message includes an identifier of the base station 28. Then, the base station 21 transmits an inter-base station interface setup response message M101 to the base station 28 (Operation S11). Thus, an inter-base station interface is set up between the base stations 21 and 28. Note that the inter-base station interface setup request message is, for example, an X2 SETUP REQUEST message. Moreover, the inter-base station interface setup response message is, for example, an X2 SETUP RESPONSE message.

When the base station 28 is connected to the base station 21, the base station identifier management section 36 of the base station 21 adds the identifier of the base station 28 to the connected base station list. Then, the base station 21 transmits to the first management device 27 a connection destination change message M102, which indicates that the base station 28 has been newly added to the connected base station list (Operation S12). The connection destination change message includes the identifier of the base station 28 newly connected to the base station 21.

Subsequently, the analysis section 42 of the first management device 27 analyzes an inter-base station topology based on the connection destination change message and updates the inter-base station topology database including connection information indicating the connection relations between the base stations (Operation S13).

The selection section 43 of the first management device 27 refers to the updated inter-base station topology database. Then, the selection section 43 selects from among the base stations of the first base station group a designated base station that will collect operation information on the base station 28, and updates the operation information acquisition-target base station database (Operation S14). Here, the selection section 43 selects a designated base station from among those base stations that are connected to the base station 28, of the base stations included in the first base station group. In the present exemplary embodiment, the base station 21 is the only base station connected to the base station 28, of the base stations included in the first base station group. Accordingly, in this case, the first management device 27 selects the base station 21 as a designated base station to acquire operation information on the base station 28.

Subsequently, the first management device 27 transmits to the base station 21 a selection message M103, which indicates that the base station 21 has been selected as a designated base station that will acquire operation information on the base station 28 (Operation S15). The selection message M103 includes the identifier of the base station 28 for which the selection of a designated base station is made.

Subsequently, the base station identifier management section 36 of the base station 21, based on the selection message M103, updates the acquisition-target base station list. In the present exemplary embodiment, the base station identifier management section 36 adds the identifier of the base station 28 to the acquisition-target base station list (Operation S16).

Subsequently, the base station identifier management section 36 notifies the operation information management section 37 that the base station 28 is newly added to the acquisition-target base station list. In response to this, the operation information management section 37 transmits an operation information request message M104 for requesting operation information to the base station 28 via the communication section 34 (Operation S17). Then, the base station 28 transmits an operation information response message M105 to the base station 21 (Operation S18). The operation information response message includes operation information on the base station 28. Thus, the operation information management section 37 of the base station 21 acquires operation information on the base station 28.

Subsequently, the operation information management section 37 of the base station 21 transmits a message M106 including the operation information on the base station 28 to the first management device 27 via the communication section 34 (Operation S19). Then, the first management device 27 adds the operation information on the base station 28 to the operation information database stored in the third database 48.

In the manner described above, the first management device 27 can acquire operation information on the base station 28, which is a base station managed by the second management device 32.

Moreover, the base station 21 having received the identifier of the base station 28 in Operation S15, thereafter, may periodically collect operation information on the base station 28 and transfer it to the first management device 27. Thus, the first management device 27 can periodically acquire the latest operation information on the base station 28 managed by the second management device 32.

Note that in FIG. 11, the base station 21 transmits the connection destination change message M102 to the first management device 27 after transmitting the inter-base station interface setup response message M101 to the base station 28, but this is not a restriction. That is, the base station 21 may transmit the inter-base station interface setup response message M101 to the base station 28 after transmitting the connection destination change message M102 and receiving the selection message M103. In this case, the base station 21 may include the message M104 for requesting operation information on the base station 28 in the inter-base station interface setup response (M101) and transmit it to the base station 28.

Next, a description will be given of a case where an inter-base station interface is set up between the base station 22 of the first base station group and the base station 28 of the second base station group. The base station 28 transmits an inter-base station interface setup request message M107 to the base station 22 (Operation S20). The base station 22 transmits an inter-base station interface setup response message M108 to the base station 28 (Operation S21).

Then, the base station 22 transmits to the first management device 27 a connected base station update message M109, which indicates that the base station 28 is newly added as a base station connected to the base station 22 (Operation S22). Here, the connected base station update message includes the identifier of the base station 28 newly connected to the base station 22.

Subsequently, the analysis section 42 of the first management device 27, based on the connected base station update message, analyzes an inter-base station topology and updates the inter-base station topology database (Operation S23).

Here, the base station 21 has been selected in Operation S14 as a designated base station to acquire operation information on the base station 28. Accordingly, the selection section 43 does not perform selection of a designated base station that will acquire operation information on the base station 28.

In this case, the first management device 27 does not transmit to the base station 22 a selection message indicating that it is selected as a designated base station. Accordingly, the base station 22 will not collect operation information on the base station 28.

As described above, the first management device 27 in the present exemplary embodiment can limit the number of base stations to acquire operation information on the base station 28 to only one. Thus, it is possible to prevent operation information on the base station 28 from being redundantly transmitted from the base stations 21 and 22 to the first management device 27.

Note that after Operation S23, when it is determined that the base station 22 is more suitable than the base station 21 for a base station that will collect operation information on the base station 28, the selection section 43 may select the base station 22 as a base station that will collect operation information on the base station 28. For example, when it is determined that the base station 22 is in lightly loaded state compared with the base station 21, a base station that will collect operation information on the base station 28 may be changed from the base station 21 to the base station 22.

In this case, the first management device 27 transmits to each of the base stations 21 and 22 a message indicating the reselection of a designated base station. That is, transmitted to the base station 21 is a message indicating that it is no longer a designated base station for the base station 28. Thus, the base station 21 deletes the identifier of the base station 28 from the acquisition-target base station list. On the other hand, transmitted to the base station 22 is a message indicating that it is selected as a designated base station for the base station 28. Thus, the base station 22 adds the identifier of the base station 28 to the acquisition-target base station list.

2.4) Operation of Base Station

Figure 12:
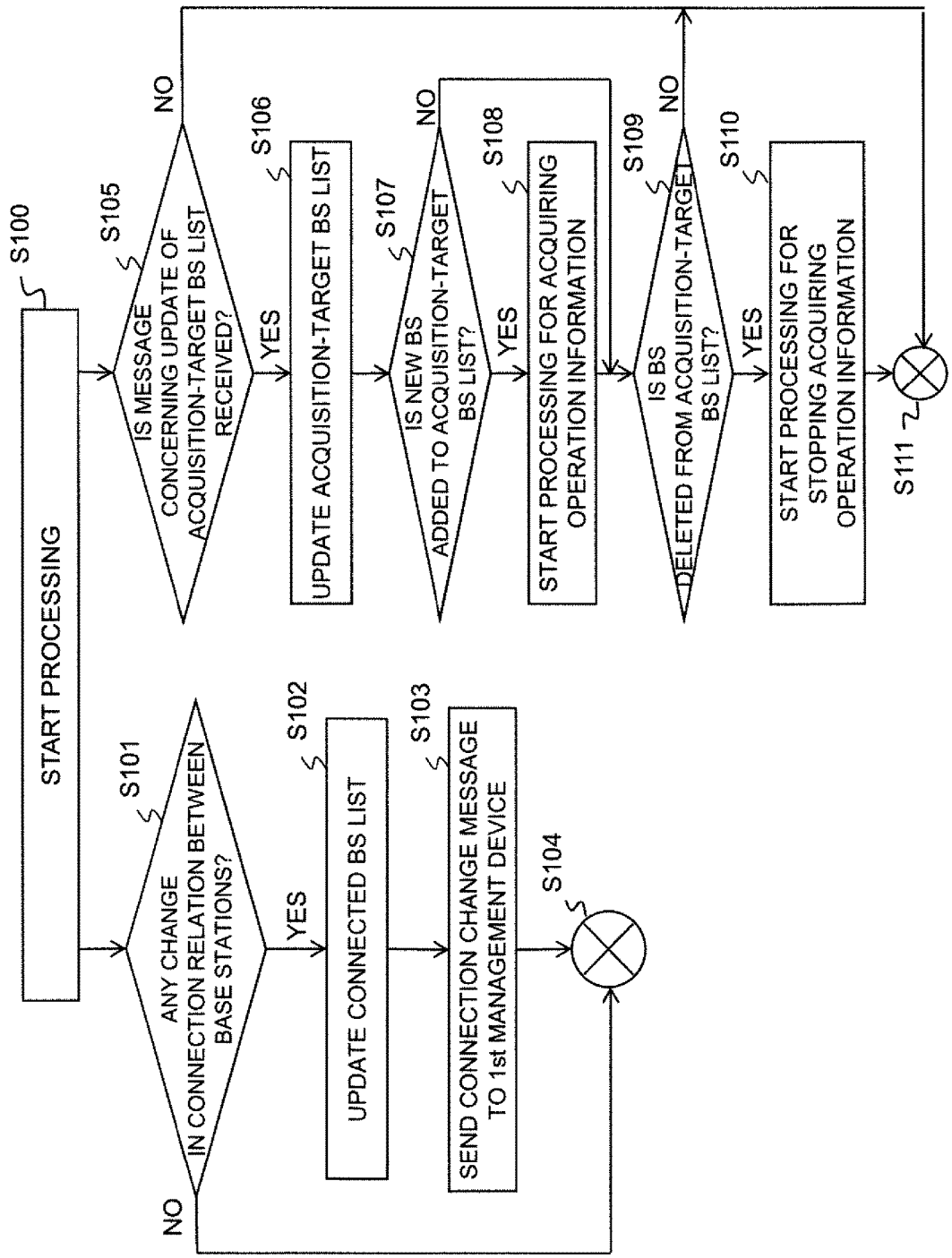
FIG. 12 is a flowchart for describing operation of a base station identifier management section in the communication system according to the second exemplary embodiment of the present invention.

Next, operations performed by the base station identifier management section 36 of the base station 21 will be described using FIG. 12. FIG. 12 shows a flowchart of the operations performed by the base station identifier management section 36.

First, a case will be described where after processing by the base station identifier management section 36 is started (Operation S100), the connection relation between the base station 21 and a base station of the second base station group is changed (YES at Operation S101).

In this case, the base station identifier management section 36 updates the connected base station list (Operation S102). Then, the base station identifier management section 36 transmits a connection change message, which notifies a change in the connection relation between the base station 21 and a base station of the second base station group, to the first management device 27 via the communication section 34 (Operation S103). The connection change message includes an identifier of a base station added to or deleted from the connected base station list of the base station 21. Note that the connection change message may be configured to include identifiers of all base stations included in the updated connected base station list.

In the manner described above, a series of processing operations related to the update of the connected base station list by the base station identifier management section 36 is completed (Operation S104). Then, the base station identifier management section 36 repeatedly performs the processing of these Operations S101 to S103, thereby managing the connected base station list.

Note that the case where the connection relation between base stations is changed refers to, for example, a case where notices concerning the addition or deletion of an inter-base station interface are received. Notices concerning the addition of an inter-base station interface include, for example, the inter-base station interface setup request message M100 and the inter-base station interface setup response message M101 in FIG. 11. Moreover, notices concerning the deletion of an inter-base station interface include, for example, an inter-base station interface deletion request message and an inter-base station interface deletion response message.

Next, a case will be described where the base station 21 receives a message concerning the update of the acquisition-target base station list (YES at Operation S105). In this case, the base station identifier management section 36 updates the acquisition-target base station list (Operation S106).

The message concerning the update of the acquisition-target base station list is, for example, a message indicating that the base station 21 is selected as a designated base station for a base station of the second base station group. When the base station 21 receives this message, the base station identifier management section 36 updates the acquisition-target base station list to add an identifier of the new base station thereto (YES at Operation S107). In this case, the base station identifier management section 36 starts processing for acquiring operation information on the base station added to the acquisition-target base station list (Operation S108). Specifically, the base station identifier management section 36 notifies the operation information management section 37 of the identifier of the base station newly added to the acquisition-target base station list. Then, the operation information management section 37 collects operation information on the added base station via the communication section 34.

Another example of the message concerning the update of the acquisition-target base station list is a message indicating that the base station 21 is no longer a designated base station for a base station of the second base station group. When the base station 21 receives this message, the base station identifier management section 36 updates the acquisition-target base station list to delete an identifier of the base station therefrom (NO at Operation S107, YES at Operation S109). In this case, the base station identifier management section 36 starts processing for stopping acquisition of operation information on the base station deleted from the acquisition-target base station list (Operation S110). Specifically, the base station identifier management section 36 notifies the operation information management section 37 of the identifier of the base station deleted from the acquisition-target base station list. Then, the operation information management section 37 stops collecting operation information on the notified base station thereafter.

In the manner described above, a series of the processing operations related to the update of the acquisition-target base station list by the base station identifier management section 36 is completed (Operation S111). Then, the base station identifier management section 36 repeatedly performs the processing of these Operations S105 to S110, thereby managing the acquisition-target base station list.

2.5) Operation of Management Device

Figure 13:
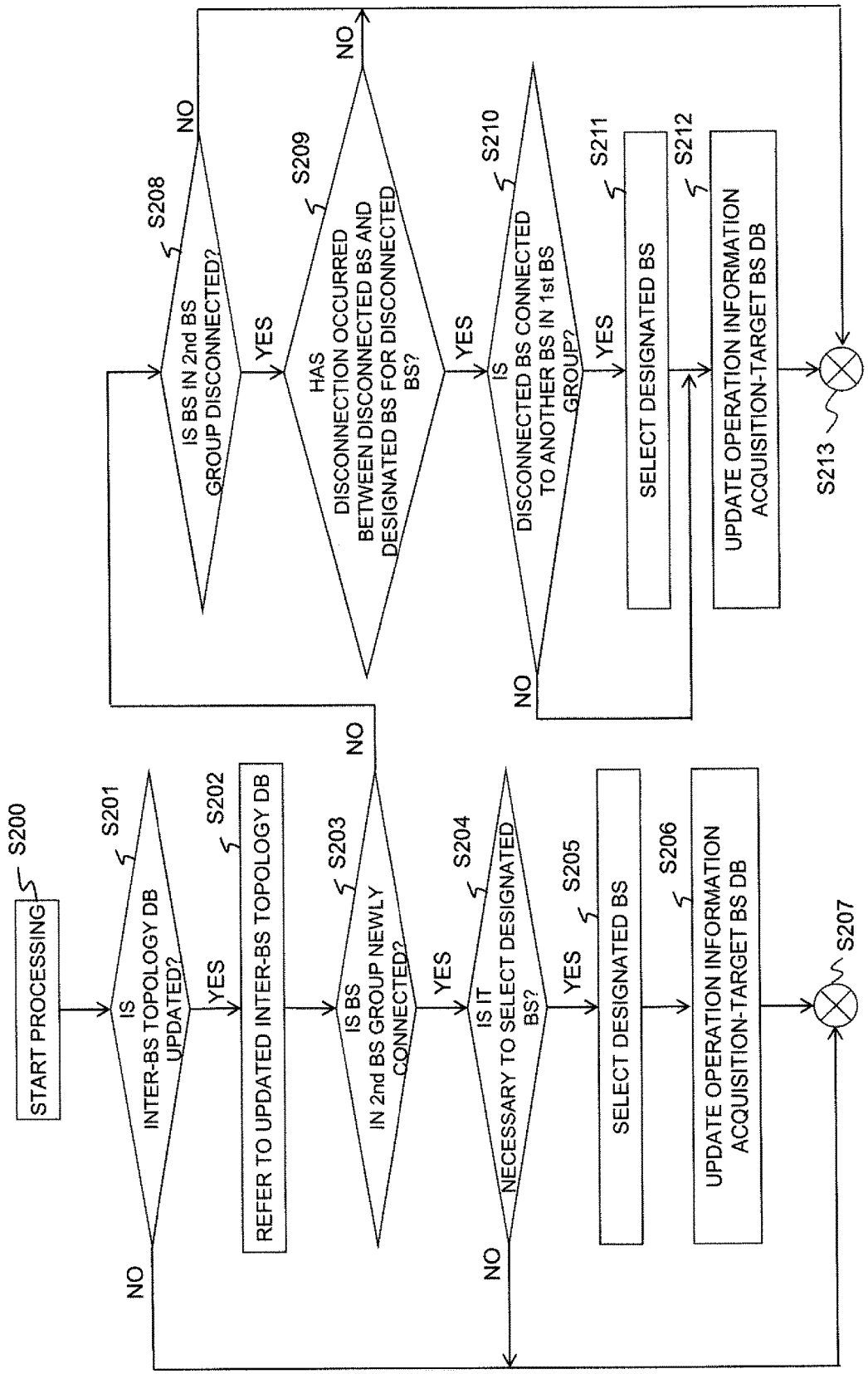
FIG. 13 is a flowchart for describing operation of a selection section in the communication system according to the second exemplary embodiment of the present invention.

Next, a description will be given of processing by the selection section 43 of the first management device 27 for updating the operation information acquisition-target base station database stored in the second database 47, using the flowchart showing FIG. 13.

The selection section 43, after starting processing (Operation S200), waits for the inter-base station topology database stored in the first database 46 to be updated. When the inter-base station topology database is updated (YES at Operation S201), the selection section 43 refers to the updated inter-base station topology database and determines how the topology is changed (Operation S202).

First, a case will be described where a base station of the second base station group is newly connected to any base station of the first base station group (YES at Operation S203). In this case, the selection section 43 determines whether or not it is necessary to select a designated base station that will acquire operation information on the newly connected base station of the second base station group (hereinafter, referred to as an added base station) (Operation S204). The case where it is necessary to select a designated base station refers to a case where a designated base station that will acquire operation information on the added base station has not yet been selected from the first base station group.

When it is necessary to select a designated base station that will acquire operation information on the added base station (YES at Operation S204), the selection section 43 selects a designated base station from among those base stations that are connected to the added base station, of the base stations of the first base station group (Operation S205). Then, the selection section 43, based on a result of the selection in Operation S205, updates the operation information acquisition-target base station database (Operation S206). That is, an identifier of the added base station is added to the B2 list in the operation information acquisition-target base station database, and then this identifier of the added base station is associated with an identifier of the designated base station selected in Operation S205.

In the manner described above, the processing for updating the operation information acquisition-target base station database by the selection section 43 is completed (Operation S207).

On the other hand, when it is not necessary to select a base station that will acquire operation information on the added base station (NO at Operation S204), the selection section 43 terminates the processing without performing Operations S205 and S206 (Operation S207).

Next, a case will be described where disconnection occurs between any base station of the first base station group and a base station of the second base station group (NO at Operation S203, YES at Operation S208). Note that a base station of the second base station group disconnected from any base station of the first base station group will be referred to as a disconnected base station.

The selection section 43 determines whether or not disconnection occurs between the disconnected base station and a base station selected as a designated base station to acquire operation information on the disconnected base station (Operation S209). Further, the selection section 43 determines whether or not this disconnected base station is connected to another base station of the first base station group (Operation S210).

In both cases where disconnection occurs between the disconnected base station and a base station selected as a designated base station to acquire operation information on the disconnected base station and where the disconnected base station is connected to another base station of the first base station group (YES at Operations S209 and S210), the selection section 43 newly selects a designated base station that will acquire operation information on the disconnected base station (Operation S211).

Then, the selection section 43, based on a result of the selection in Operation S211, updates the operation information acquisition-target base station database (Operation S212) and completes the processing (Operation S213).

For example, referring to FIGS. 8 and 9, when disconnection occurs between the base stations 21 and 29, the following processing is performed. The base station 21 is a base station selected as a designated base station to acquire operation information on the base station 29 (YES at Operation S209). Moreover, the base station 29 remains connected to the base stations 22 to 25 after it is disconnected from the base station 21 (YES at Operation S210). Accordingly, the selection section 43 selects a designated base station that will acquire operation information on the base station 29 from among the base stations 22 to 25 (Operation S211).

Next, a case will be describe where disconnection occurs between the disconnected base station and a base station selected as a designated base station for the disconnected base station (YES at Operation S209) but the disconnected base station is not connected to any of the other base stations of the first base station group (NO at Operation S210). In this case, the selection section 43 updates the operation information acquisition-target base station database to delete an identifier of the disconnected base station therefrom (Operation S212) and completes the processing (Operation S213).

Note that when a base station of the first base station group disconnected from the disconnected base station has not been selected as a designated base station to acquire operation information on the disconnected base station (NO at Operation S209), the selection section 43 terminates the processing without changing the operation information acquisition-target base station database (Operation S213).

Next, a description will be given of processing performed by the selection section 43 when disconnection occurs between the first management device 27 and a base station of the first base station group, using FIG. 14.

Figure 14:
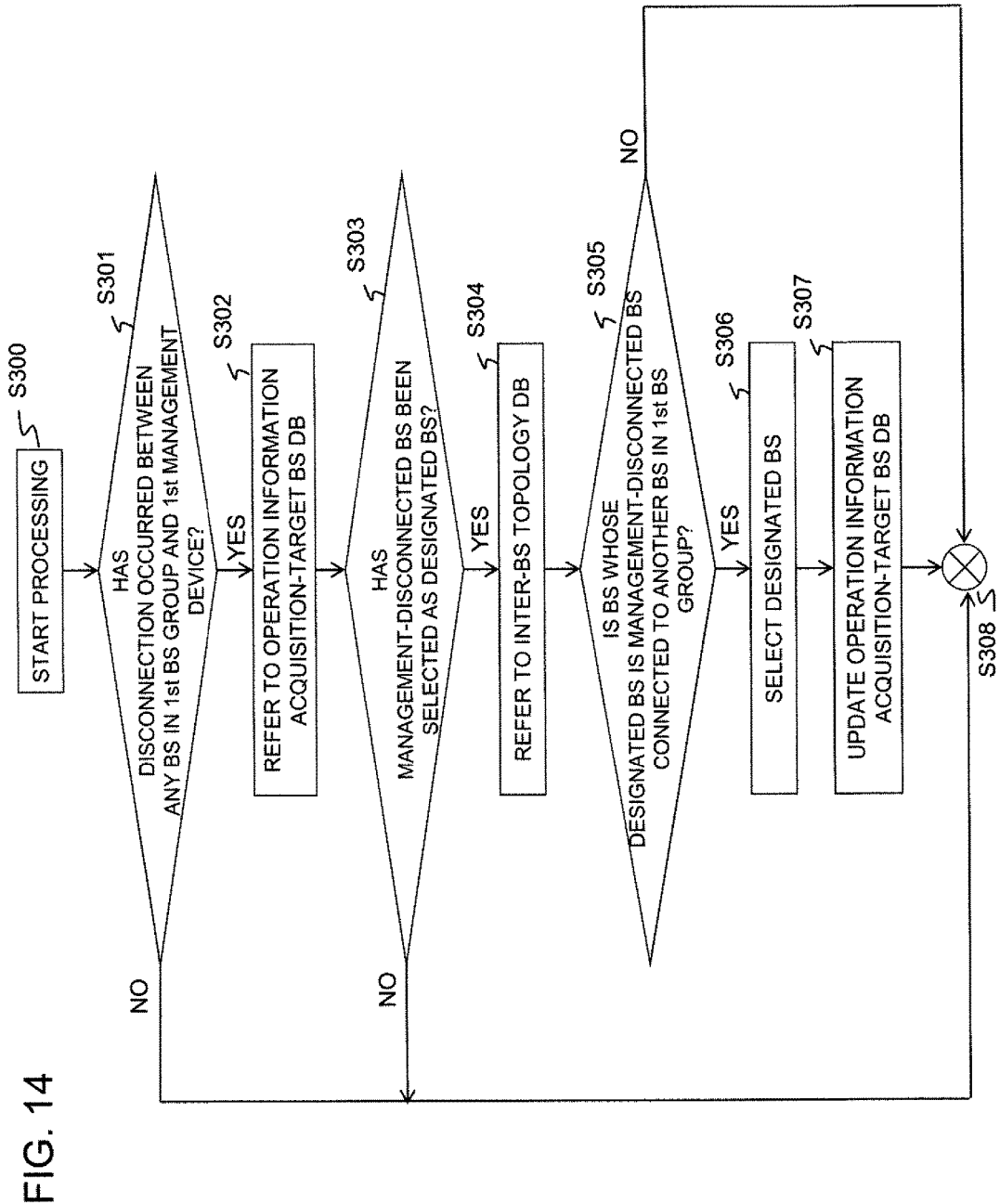
FIG. 14 is a flowchart for describing operation of the selection section in the communication system according to the second exemplary embodiment of the present invention.

Referring to FIG. 14, it is assumed that after processing by the selection section 43 is started (Operation 300), disconnection occurs between the first management device 27 and a base station of the first base station group (YES at Operation S301).

In this case, the selection section 43 first refers to the operation information acquisition-target base station database (Operation S302). Then, the selection section 43 determines whether or not the base station of the first base station group disconnected from the first management device 27 (hereinafter, referred to as a management-disconnected base station) has been selected as a designated base station to acquire operation information on any base station of the second base station group (Operation S303). Here, when the management-disconnected base station has not been selected as a designated base station for any base station of the second base station group (NO at Operation S303), the processing is terminated (Operation S308).

On the other hand, when the management-disconnected base station has been selected as a designated base station for any base station of the second base station group (YES at Operation S303), the selection section 43 refers to the inter-base station topology database (Operation S304). Then, the selection section 43 determines whether or not the base station of the second base station on which the management-disconnected base station is to acquire operation information is connected to another base station of the first base station group (Operation S305). Here, when the base station of the second base station on which the management-disconnected base station is to acquire operation information is not connected to another base station of the first base station group (NO at Operation S305), the processing is terminated (Operation S308).

Moreover, in case of YES at Operation S305, the selection section 43 newly selects a designated base station that will collect operation information on the base station of the second base station group, from among the other base stations of the first base station group (Operation S306). Then, the selection section 43, based on a result of the selection in Operation S306, updates the operation information acquisition-target base station database (Operation S307).

For example, a case will be described where disconnection occurs between the first management device 27 and the base station 23 in Operation S301. Referring to the operation information acquisition-target base station database shown in FIG. 9, the base station 23 is selected as a designated base station for the base station 30 of the second base station group (YES at Operation S303). Moreover, referring to the inter-base station topology database shown in FIG. 8, the base station 30 is connected to the base stations 24 to 26 of the first base station group (YES at Operation S305). Accordingly, the base station 43 newly selects a designated base station that will acquire operation information on the base station 30, from among the base stations 24 to 26 of the first base station group and updates the operation information acquisition-target base station database (Operations S306 and S307).

Note that in Operation S303, when the management-disconnected base station is selected as a designated base station for a plurality of base stations of the second base station group, the processing of Operations S304 to 307 is performed sequentially for each of the plurality of base stations.

Then, the selection section 43 repeatedly performs the processing of Operations S201 to S213 and Operations S301 to S307, thereby updating the operation information acquisition-target base station database.

2.6) Effects

As described above, according to the present exemplary embodiment, even when a change occurs in the topology between base stations or in the topology between the first management device 27 and base stations, the first management device 27 can select a base station that will collect operation information on a base station of the second base station group, from among the base stations of the first base station group.

Thus, the first management device 27 in the present exemplary embodiment can acquire operation information on base stations of the second base station group and so can perform network autonomous optimization of the communication system 20.

Moreover, the first management device 27 in the present exemplary embodiment is configured to select only one designated base station that will acquire operation information on a base station of the second base station group, from among the base stations of the first base station group. Accordingly, it is possible to reduce the amount of operation information on base stations transmitted and received over inter-base station interfaces, in comparison with a case where each of the plurality of base stations of the first base station group collects operation information on the same base station of the second base station group and transmits it to the first management device 27. Thus, the bandwidth of the inter-base station interfaces can be efficiently used.

Note that in the present exemplary embodiment, only one base station that will acquire operation information on a base station of the second base station group is selected from among the base stations of the first base station group, but this is not a restriction. For example, a plurality of base stations that will acquire operation information on a base station of the second base station group may be selected from the first base station group.

Moreover, in the present exemplary embodiment, when the inter-base station interface setup request message M100 is transmitted to a base station of the first base station group from a base station of the second base station group, the base station of the first base station group collects operation information on the base station of the second base station group, but this is not a restriction. For example, a base station of the first base station group may collect operation information on a base station of the second base station group when transmission and reception of a base station configuration change message via a core network, or a RIM (RAN Information Management) message between different radio access systems, are performed. Note that the base station configuration change message is, for example, an ENB CONFIGURATION TRANSFER/MME CONFIGURATION TRANSFER message.

Furthermore, in the present exemplary embodiment, the first management device 27 performs the storing and updating of the inter-base station topology database and the operation information acquisition-target base station database, but this is not a restriction. For example, all or part of the processing for storing and for updating the inter-base station topology database and the operation information acquisition-target base station database may be performed by a base station. In this case, base stations share the inter-base station topology database and the operation information acquisition-target base station database, and a base station itself may determine the necessity of collection and transfer of operation information.

Moreover, the first management device 27 in the present exemplary embodiment may be a base station management device primarily managing base stations (e.g., EMS) or may be a network management device secondarily managing base stations (e.g., NMS).

Further, in the present exemplary embodiment, operation information on a base station is transmitted and received between base stations, but this is not a restriction. That is, the present exemplary embodiment may be applied to network nodes other than base stations. For example, the configuration and operation of a base station in the present exemplary embodiment may be applied to an EMS, and the configuration and operation of the first management device 27 may be applied to an NMS. In this case, for example, the Itf-N interface prescribed by 3GPP may be used for transmission and reception of operation information between EMSs.

3. Third Exemplary Embodiment

As described in the second exemplary embodiment above, the first management device 27 updates network setting information, based on not only operation information on base stations of the first base station group but also operation information on base stations of the second base station group collected through base stations of the first base station group. Accordingly, when information elements included in the operation information collected are insufficient, network setting information cannot be appropriately updated, and network performance cannot be efficiently improved.

Accordingly, in the present exemplary embodiment, a consideration will be given of the information elements of operation information on base stations to be collected by a management device.

FIG. 15 shows the information elements of operation information on base stations to be collected by a management device in the present exemplary embodiment. Note that the first management device 27 collects operation information on base stations of the second base station group through base station(s) of the first base station group. Accordingly, the operation information shown in FIG. 15 is transmitted and received by using inter-base station interfaces and interfaces between the management device and base stations.

The operation information shown in FIG. 15 is configured to include the number of active users, in addition to the information elements of the operation information shown in FIG. 10. The number of active users in a cell is the number of communication terminals (user equipment) connected to a base station in the cell. Here, the number of active users may refer to the number of communication terminals concurrently connected to a base station, or may refer to the number of communication terminals connected within a predetermined time range. Here, there is a correlation between the number of active users relative to the load on a cell and the user throughput. Accordingly, information on the number of active users is included in the operation information, whereby the management device can perform load balancing, considering not only the leveling of the loads on cells but also the leveling of user throughputs. Thus, network autonomous optimization can be performed more efficiently. Note that the load on and the number of active users in a cell may be the load on and the number of active users in a whole cell, respectively, or these values may be separated under individual service types in a cell. Alternatively, the load on and the number of active users in a cell may be separated under individual providers subscribed to by users.

Moreover, the operation information shown in FIG. 15 is configured to include the value of maximum transmission power in a cell. Thus, a management device can grasp the types of cells (macro cell, micro cell, pico cell) formed by base stations and the execution states of processing for changing transmission power at base stations.

As other examples of the information elements included in the operation information, for example, a set value of reference signal transmission power in a cell may be included. Alternatively, the probability distribution of the user throughputs of user equipment in a cell may be included. These kinds of information are included, whereby the first management device 27 can perform network autonomous optimization more efficiently.

As described above, the first management device 27 can improve network characteristics more efficiently by updating network setting information based on the operation information shown in FIG. 15.

Moreover, the information elements of the operation information shown in FIG. 15 can be applied not only to the second exemplary embodiment but also to the operation information transmitted and received in the first exemplary embodiment.

Further, the network nodes and management devices in the first to third exemplary embodiments can be applied to network nodes and management devices in a SON system, which autonomously optimizes radio parameters in mobile communication.

Figure 1:
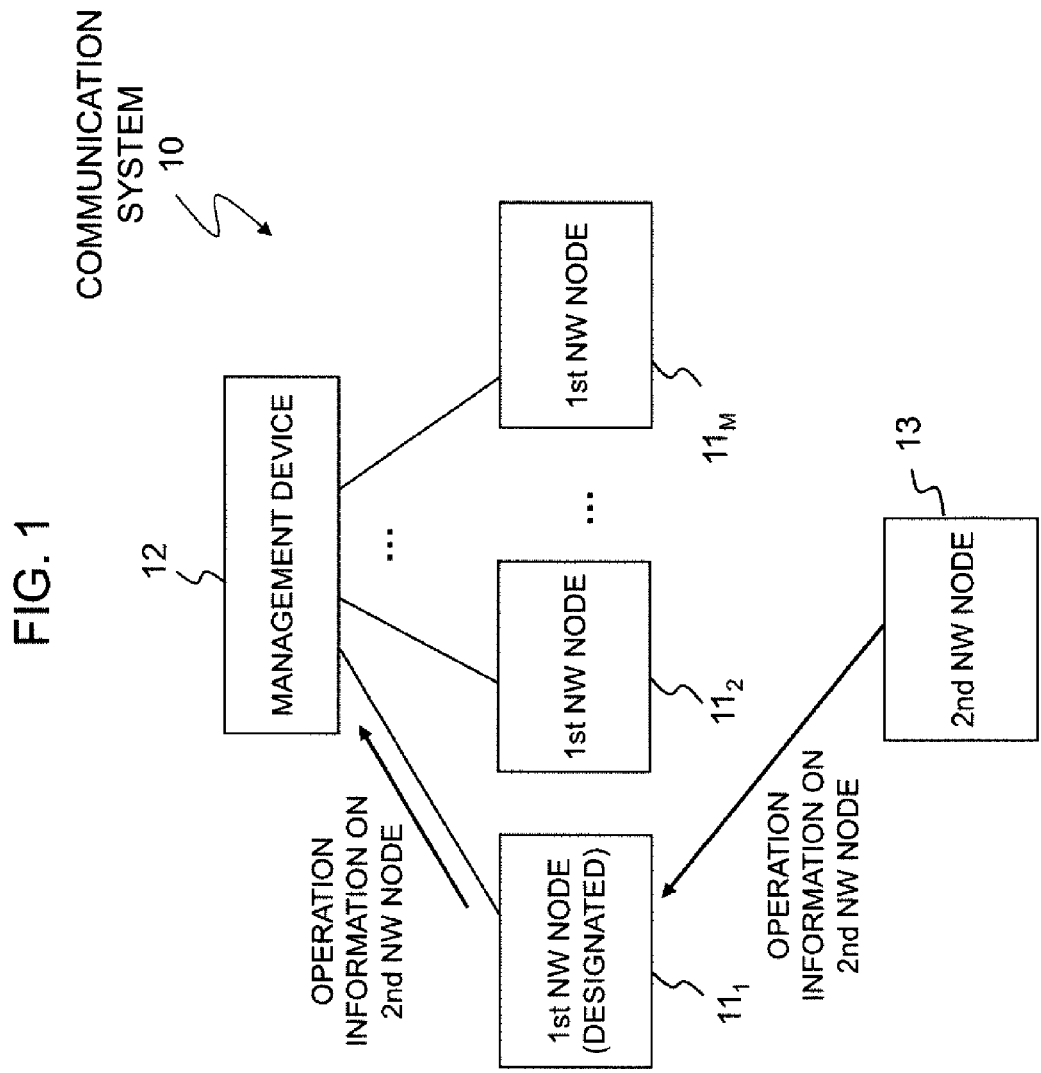
FIG. 1 is a block diagram showing a schematic architecture of a communication system according to a first exemplary embodiment of the present invention.

Furthermore, the operations in the communication systems described in the first to third exemplary embodiments may be controlled by a CPU (Central Processing Unit) of a device included in the communication system shown in FIG. 1 or 5, or of another device communicable with this device. In this case, it is needless to say that the operations are accomplished in such a manner that a recording medium storing software program codes for implementing the functionality in each embodiment is prepared and the CPU is caused to operate by a general computer reading the program codes stored in the recording medium.

Note that the recording medium providing the programs may be any one as long as it can store the above-described programs, such as, for example, CD-ROM (Compact Disc Read Only Memory), DVD-R (Digital Versatile Disk Recordable), optical disk, magnetic disk, or nonvolatile memory card.

Moreover, in the second and third exemplary embodiments, the type of a base station is not limited. That is, a base station may be any of a macro base station configuring a macro cell, a pico base station configuring a pico cell, and a femto base station (HNB (Home Node B) or HeNB) configuring a femto cell.

4. Additional Statements

Part or all of the above-described exemplary embodiments also can be stated as in, but is not limited to, the following additional statements.
(Additional Statement 1)
A communication system comprising: a plurality of first network nodes; a management device managing the plurality of first network nodes; and a second network node managed by another management device different from the management device, wherein the management device selects a designated network node that will acquire operation information on the second network node, from among the plurality of first network nodes, and the designated network node acquires the operation information from the second network node and transmits the operation information to the management device.
(Additional Statement 2)
The communication system according to additional statement 1, wherein one first network node is selected as the designated network node, from among the plurality of first network nodes.
(Additional Statement 3)
The communication system according to additional statement 1 or 2, wherein the management device transmits a selection message to the designated network node, and when the designated network node receives the selection message, the designated network node transmits the operation information on the second network node to the management device.
(Additional Statement 4)
The communication system according to any one of additional statements 1 to 3, wherein the management device creates association information in which the designated network node and the second network node are associated with each other.
(Additional Statement 5)
The communication system according to any one of additional statements 1 to 4, wherein the communication system includes a plurality of the second network nodes, and, for them, the management device selects respective designated network nodes that will respectively acquire operation information on the individual second network nodes, from among the plurality of first network nodes.
(Additional Statement 6)
The communication system according to any one of additional statements 1 to 5, wherein the management device refers to connection information indicating connection relations between the plurality of first network nodes and the second network node, to select the designated network node from among the plurality of first network nodes.
(Additional Statement 7)
The communication system according to additional statement 6, wherein the first network nodes, when changing the connection relations with the second network node, transmit a connection change message, which notifies a change in the connection relations, to the management device, and the management device updates the connection information based on the connection change message.
(Additional Statement 8)
The communication system according to any one of additional statements 1 to 7, wherein both when a connection between the second network node and the designated network node is deleted, and when the second network node is connected to at least one first network node of the plurality of first network nodes, the management device newly selects the designated network node from among the first network nodes connected to the second network node.
(Additional Statement 9)
The communication system according to any one of additional statements 1 to 8, wherein the management device performs selection of the designated network node when a predetermined message occurs, wherein the predetermined message is at least one of an interface setup request message, a base station configuration change message, and a RAN information management message.
(Additional Statement 10)
The communication system according to any one of additional statements 1 to 9, wherein when disconnection occurs between the designated network node and the management device, the management device newly selects the designated network node from among those first network nodes connected to the management device.
(Additional Statement 11)
The communication system according to any one of additional statements 1 to 9, wherein the operation information includes at least one of the number of communication terminals connected to the second network node and maximum transmission power of the second network node.

(Additional Statement 12)

The communication system according to any one of additional statements 1 to 11, wherein the first and second network nodes are base stations communicating with mobile terminals, and the management devices are base station management devices managing the base stations.

(Additional Statement 13)

The communication system according to any one of additional statements 1 to 11, wherein the first and second network nodes are base station management devices managing base stations, and the management devices are network management devices managing the base station management devices.

(Additional Statement 14)

The communication system according to any one of additional statements 1 to 13, wherein the management device further comprises an update section, wherein the update section updates network setting information for the communication system, based on the operation information on the second network node.

(Additional Statement 15)

A management device managing a plurality of first network nodes, comprising: a selection section for selecting a designated network node that will acquire operation information on a second network node managed by another management device different from the management device, from among the plurality of first network nodes; and a communication section for receiving the operation information on the second network node from the designated network node.

(Additional Statement 16)

The management device according to additional statement 15, wherein one first network node is selected as the designated network node, from among the plurality of first network nodes.

(Additional Statement 17)

The management device according to additional statement 15 or 16, wherein the management device transmits a selection message to the designated network node, and when the designated network node receives the selection message, the designated network node transmits the operation information on the second network node to the management device.

(Additional Statement 18)

The management device according to any one of additional statements 15 to 17, wherein the management device creates association information in which the designated network node and the second network node are associated with each other.

(Additional Statement 19)

The management device according to any one of additional statements 15 to 18, wherein the another management device manages a plurality of the second network nodes, and, for them, the management device selects respective designated network nodes that will respectively acquire operation information on the individual second network nodes, from among the plurality of first network nodes.

(Additional Statement 20)

The management device according to any one of additional statements 15 to 19, wherein the management device refers to connection information indicating connection relations between the plurality of first network nodes and the second network node, to select the designated network node from among the plurality of first network nodes.

(Additional Statement 21)

The management device according to additional statement 20, wherein the first network nodes, when changing the connection relations with the second network node, transmit a connection change message, which notifies a change in the connection relations, to the management device, and the management device updates the connection information based on the connection change message.

(Additional Statement 22)

The management device according to any one of additional statements 15 to 21, wherein both when a connection between the second network node and the designated network node is deleted, and when the second network node is connected to at least one first network node of the plurality of first network nodes, the management device newly selects the designated network node from among the first network nodes connected to the second network node.

(Additional Statement 23)

The management device according to any one of additional statements 15 to 22, wherein the management device performs selection of the designated network node when a predetermined message occurs, wherein the predetermined message is at least one of an interface setup request message, a base station configuration change message, and a RAN information management message.

(Additional Statement 24)

The management device according to any one of additional statements 15 to 23, wherein when disconnection occurs between the designated network node and the management device, the management device newly selects the designated network node from among those first network nodes connected to the management device.

(Additional Statement 25)

The management device according to any one of additional statements 15 to 24, wherein the operation information includes at least one of the number of communication terminals connected to the second network node and maximum transmission power of the second network node.

(Additional Statement 26)

The management device according to any one of additional statements 15 to 25, wherein the first and second network nodes are base stations communicating with mobile terminals, and the management devices are base station management devices managing the base stations.

(Additional Statement 27)

The management device according to any one of additional statements 15 to 25, wherein the first and second network nodes are base station management devices managing base stations, and the management devices are network management devices managing the base station management devices.

(Additional Statement 28)

The management device according to any one of additional statements 15 to 27, wherein the management device further comprises an update section, wherein the update section updates network setting information for the communication system, based on the operation information on the second network node.

(Additional Statement 29)

A first network node managed by a management device, comprising: a communication section that, when the first network node is selected as a designated network node that will acquire operation information on a second network node managed by another management device different from the management device, transmits the operation information on the second network node to the management device.

(Additional Statement 30)

The first network node according to additional statement 29, wherein one first network node is selected as the designated network node, from among the plurality of first network nodes.

(Additional Statement 31)

The first network node according to additional statement 29 or 30, wherein the management device transmits a selection message to the designated network node, and when the designated network node receives the selection message, the designated network node transmits the operation information on the second network node to the management device.

(Additional Statement 32)

The first network node according to any one of additional statements 29 to 31, wherein the management device creates association information in which the designated network node and the second network node are associated with each other.

(Additional Statement 33)

The first network node according to any one of additional statements 29 to 32, wherein the another management device manages a plurality of the second network nodes, and, for them, the management device selects respective designated network nodes that will respectively acquire operation information on the individual second network nodes, from among the plurality of first network nodes.

(Additional Statement 34)

The first network node according to any one of additional statements 29 to 33, wherein the management device refers to connection information indicating connection relations between the plurality of first network nodes and the second network node, to select the designated network node from among the plurality of first network nodes.

(Additional Statement 35)

The first network node according to additional statement 34, wherein the first network node, when changing its connection relation with the second network node, transmits a connection change message, which notifies a change in the connection relation, to the management device, and the management device updates the connection information based on the connection change message.

(Additional Statement 36)

The first network node according to any one of additional statements 29 to 35, wherein both when a connection between the second network node and the designated network node is deleted, and when the second network node is connected to at least one first network node of the plurality of first network nodes, the management device newly selects the designated network node from among the first network nodes connected to the second network node.

(Additional Statement 37)

The first network node according to any one of additional statements 29 to 36, wherein the management device performs selection of the designated network node when a predetermined message occurs, wherein the predetermined message is at least one of an interface setup request message, a base station configuration change message, and a RAN information management message.

(Additional Statement 38)

The first network node according to any one of additional statements 29 to 37, wherein when disconnection occurs between the designated network node and the management device, the management device newly selects the designated network node from among those first network nodes connected to the management device.

(Additional Statement 39)

The first network node according to any one of additional statements 29 to 38, wherein the operation information includes at least one of the number of communication terminals connected to the second network node and maximum transmission power of the second network node.

(Additional Statement 40)

The first network node according to any one of additional statements 29 to 39, wherein the first and second network nodes are base stations communicating with mobile terminals, and the management devices are base station management devices managing the base stations.

(Additional Statement 41)

The first network node according to any one of additional statements 29 to 39, wherein the first and second network nodes are base station management devices managing base stations, and the management devices are network management devices managing the base station management devices.

(Additional Statement 42)

The first network node according to any one of additional statements 29 to 41, wherein the management device further comprises an update section, wherein the update section updates network setting information for the communication system, based on the operation information on the second network node.

(Additional Statement 43)

A communication method, comprising the steps of: selecting a designated network node that will acquire operation information on the second network node, from among a plurality of first network nodes; by the designated network node, transmitting the operation information on the second network node to the management device; and by the management device, receiving the operation information on the second network node.

(Additional Statement 44)

The communication method according to additional statement 43, wherein one first network node is selected as the designated network node, from among the plurality of first network nodes.

(Additional Statement 45)

The communication method according to additional statement 43 or 44, comprising the steps of: transmitting a selection message to the designated network node; and when the selection message is received, transmitting the operation information on the second network node to the management device.

(Additional Statement 46)

The communication method according to any one of additional statements 43 to 45, comprising the step of creating association information in which the designated network node and the second network node are associated with each other.

(Additional Statement 47)

The communication method according to any one of additional statements 43 to 46, comprising the step of, for a plurality of second network nodes, selecting respective designated network nodes that will respectively acquire operation information on the individual second network nodes, from among the plurality of first network nodes.

(Additional Statement 48)

The communication method according to any one of additional statements 43 to 47, comprising the step of referring to connection information indicating connection relations between the plurality of first network nodes and the second network node, to select the designated network node from among the plurality of first network nodes.

(Additional Statement 49)

The communication method according to additional statement 48, comprising the steps of: when changing the connection relations between the first network nodes and the second network node, transmitting a connection change message, which notifies a change in the connection relations; and updating the connection information based on the connection change message.

(Additional Statement 50)

The communication method according to any one of additional statements 43 to 49, comprising the step of, both when a connection between the second network node and the designated network node is deleted, and when the second network node is connected to at least one first network node of the plurality of first network nodes, newly selecting the designated network node from among the first network nodes connected to the second network node.

(Additional Statement 51)

The communication method according to any one of additional statements 43 to 50, comprising the step of performing selection of the designated network node when a predetermined message occurs, wherein the predetermined message is at least one of an interface setup request message, a base station configuration change message, and a RAN information management message.

(Additional Statement 52)

The communication method according to any one of additional statements 43 to 51, comprising the step of, when disconnection occurs between the designated network node and the management device, newly selecting the designated network node from among those first network nodes connected to the management device.

(Additional Statement 53)

The communication method according to any one of additional statements 43 to 52, wherein the operation information includes at least one of the number of communication terminals connected to the second network node and maximum transmission power of the second network node.

(Additional Statement 54)

The communication method according to any one of additional statements 43 to 53, wherein the first and second network nodes are base stations communicating with mobile terminals, and the management device is a base station management device managing the base station.

(Additional Statement 55)

The communication method according to any one of additional statements 43 to 53, wherein the first and second network nodes are base station management devices managing base stations, and the management device is a network management device managing the base station management device.

(Additional Statement 56)

The communication method according to any one of additional statements 43 to 55, comprising the step of updating network setting information for the communication system, based on the operation information on the second network node.

(Additional Statement 57)

A program causing a computer to execute the steps of: selecting a designated network node that will acquire operation information on the second network node, from among a plurality of first network nodes; by the designated network node, transmitting the operation information on the second network node to the management device; and by the management device, receiving the operation information on the second network node.

(Additional Statement 58)

A recording medium that is a computer-readable information recording medium, the recording medium recording the program according to additional statement 57.

REFERENCE SIGNS LIST

10, 20 Communication system
$11_{1-M}$ First network node
12 Management device
13 Second network node
14, 16, 34, 41 Communication section
15, 43 Selection section
21-26, 28-31 Base station
27 First management device
32 Second management device
33 Inter-base station interface
35 Call control section
36 Base station identifier management section
37 Operation information management section
38 First communication section
39 Second communication section
40 Third communication section
42 Analysis section
44 Collection section
45 Update section
46 First database
47 Second database
48 Third database

The invention claimed is:

1. A communication system comprising:
a first management device managing a plurality of first network nodes; and
a second management device managing a plurality of second network nodes,
wherein the first management device is not configured to receive operation information from any one of the plurality of second network nodes,
at least one of the plurality of first network nodes and at least one of the plurality of second network nodes are configured to communicate with each other via a predetermined interface,
the first management device is configured to select a first network node as a designated network node from among the plurality of first network nodes, and
the designated network node acquires operation information, from a second network node managed by the second management device, via the predetermined interface and transmits the operation information to the first management device.

2. The communication system according to claim 1, wherein the management device transmits a selection message to the designated network node, and
when the designated network node receives the selection message, the designated network node transmits the operation information on the second network node to the first management device.

3. The communication system according to claim 1, wherein the first management device refers to connection information indicating connection relations between the plurality of first network nodes and the second network node, to select the designated network node from among the plurality of first network nodes.

4. The communication system according to claim 1, wherein when a connection between the second network node and the designated network node is deleted and when the second network node is connected to at least one first network node of the plurality of first network nodes, the first management device newly selects another first network node as a designated network node from among the first network nodes connected to the second network node.

5. The communication system according to claim 1, wherein when disconnection occurs between the designated network node and the first management device, the first management device newly selects another first network node as a designated network node from among the first network nodes connected to the first management device.

6. A first management device managing a plurality of first network nodes, the first management device not being configured to receive operation information from a plurality of second network nodes managed by a second management device, at least one of a plurality of first network nodes and at least one of a plurality of second network nodes being configured to communicate with each other via a predetermined interface, the first management device comprising:
one or more processors configured to select a first network node as a designated network node from among the plurality of first network nodes, the designated network node acquiring operation information on a second network node managed by the second management device via the predetermined interface; and
a communication device configured to receive the operation information on the second network node from the designated network node.

7. A first network node managed by a first management device, the first management device not being configured to receive operation information from a plurality of second network nodes managed by a second management device, the network node comprising:
a communication device that is configured to communicate with at least one of the second network nodes managed by the second management device via a predetermined interface; and
a controller configured to
when the first network node is selected as a designated network node, acquire operation information on a second network node, and
transmit the operation information on the second network node to the first management device.

8. A communication method in a network that includes a plurality of first network nodes managed by a first management device and a plurality of second network nodes managed by a second management device, the first management device not being configured to receive operation information from the plurality of second network nodes, at least one of the first network nodes and at least one of the second network nodes being configured to communicate with each other via a predetermined interface, the method comprising:
selecting, by the first management device, a first network node as a designated network node from among the plurality of first network nodes, the designated network node being configured to acquire operation information from a second network node managed by the second management device via the predetermined interface and being configured to transmit the operation information on the second network node to the first management device; and
receiving, by the first management device, the operation information on the second network node from the designated network node.

9. The communication method according to claim 8, wherein the first management device transmits a selection message to the designated network node, and when receiving the selection message, the designated network node transmits the operation information on the second network node to the first management device.

10. The communication method according to claim 8, wherein the first management device refers to connection information indicating connection relations between the plurality of first network nodes and the second network node, to select the designated network node from among the plurality of first network nodes.

11. The communication method according to claim 8, wherein when a connection between the second network node and the designated network node is deleted, and when the second network node is connected to at least one first network node of the plurality of first network nodes, the first management device newly selects another first network node as the designated network node from among the first network nodes connected to the second network node.

12. The communication method according to claim 8, wherein when disconnection occurs between the designated network node and the first management device, the management device newly selects another first network node as the designated network node from among the first network nodes connected to the first management device.

13. A program, embedded on a non-transitory computer-recording medium, causing a computer to function as a first management device managing a plurality of first network nodes, the first management device not being configured to receive operation information from a plurality of second network nodes managed by a second management device, at least one of a plurality of first network nodes and at least one of a plurality of second network nodes being configured to communicate with each other via a predetermined interface, the computer being caused to implement the functions of:
selecting a first network node as a designated network node from among the plurality of first network nodes, the designated network node being configured to acquire operation information on a second network node managed by the second management device via the predetermined interface; and
receiving the operation information on the second network node from the designated network node.

14. A non-transitory recording medium that is a computer-readable information recording medium configured to cause the computer to execute the functions according to claim 13.

15. The first management device according to claim 6, wherein when at least one designated network node is selected, the communication device transmits a selection message to the designated network node.

16. The first management device according to claim 6, wherein the one or more processors refers to connection information indicating connection relations between the plurality of first network nodes and the one second network node, to select the first network node as the designated network node from among the plurality of first network nodes.

17. The first management device according to claim 6, wherein when a connection between the second network node and the designated network node is deleted, and when the second network node is connected to at least one first network node of the plurality of first network nodes, the one or more processors newly selects another first network node as the designated network node from among the first network nodes connected to the second network node.

18. The first management device according to claim 6, wherein when disconnection occurs between the designated network node and the first management device, the one or more processors newly selects another first network node as the designated network node from among the first network nodes connected to the first management device.

* * * * *